(12) United States Patent
Faigle et al.

(10) Patent No.: US 6,550,807 B1
(45) Date of Patent: Apr. 22, 2003

(54) AIR BAG MODULE WITH ELECTRONICALLY MODULATED VENT

(75) Inventors: Ernst M. Faigle, Dryden, MI (US); Tracy S. Sparks, Attica, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/717,918

(22) Filed: Nov. 21, 2000

(51) Int. Cl.[7] .............................................. B60R 21/28
(52) U.S. Cl. ...................... 280/739; 280/736; 280/742
(58) Field of Search ................................. 280/739, 736, 280/741, 742, 728.2

(56) References Cited

U.S. PATENT DOCUMENTS

| | | | | |
|---|---|---|---|---|
| 5,184,845 A | * | 2/1993 | Omura | 280/739 |
| 5,366,242 A | * | 11/1994 | Faigle et al. | 280/739 |
| 5,489,117 A | * | 2/1996 | Huber | 280/739 |
| 5,664,802 A | * | 9/1997 | Harris et al. | 280/736 |
| 5,695,214 A | | 12/1997 | Faigle et al. | |
| 5,709,405 A | * | 1/1998 | Saderholm et al. | 280/739 |
| 5,743,558 A | * | 4/1998 | Seymour | 280/739 |
| 5,853,192 A | | 12/1998 | Sikorski et al. | |
| 6,241,279 B1 | * | 6/2001 | Ochiai | 280/739 |

\* cited by examiner

Primary Examiner—Eric Culbreth
(74) Attorney, Agent, or Firm—Tarolli, Sundheim, Covell & Tummino L.L.P.

(57) ABSTRACT

A vehicle occupant protection apparatus (10) comprises an inflatable vehicle occupant protection device (12) and an inflation fluid source (18). The apparatus (10) includes a structure (14) having a vent opening (50) for directing inflation fluid away from the inflatable device (12). The apparatus (10) also includes a member (60) movable between a closed condition closing the vent opening (50) and an open condition enabling flow of inflation fluid (14) through the vent opening. The apparatus (10) includes an electrically energizable mechanism (70) to move the member (60) from the closed condition to the open condition to vent inflation fluid through the vent opening (50). The mechanism (70) can also move the member (60) from the open condition to the closed condition to inhibit venting of inflation fluid through the vent opening (50).

2 Claims, 3 Drawing Sheets

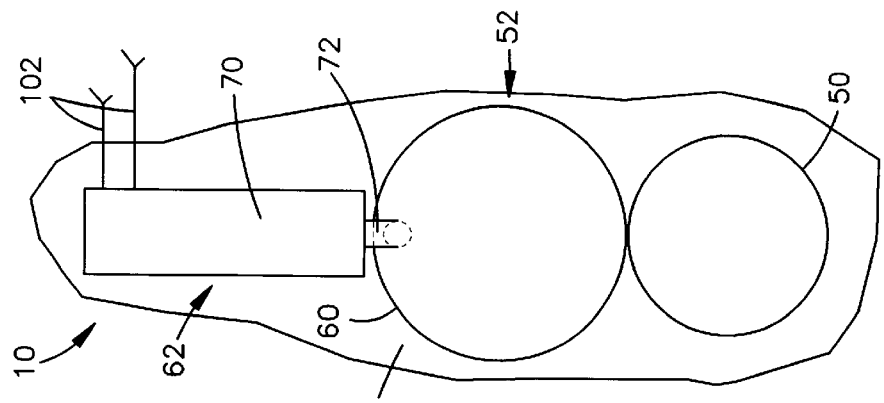
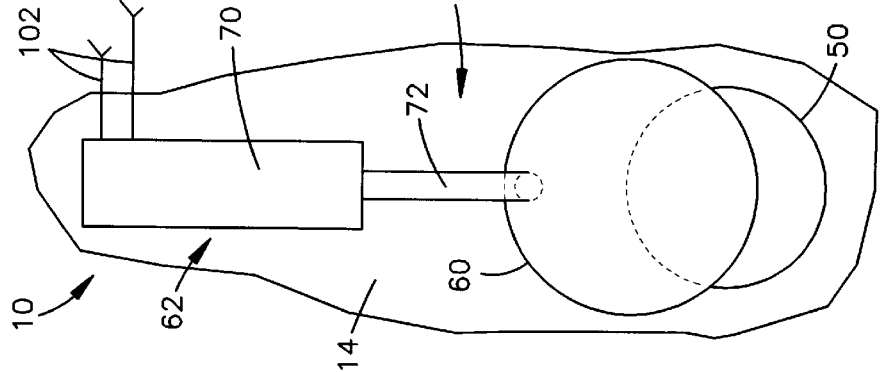
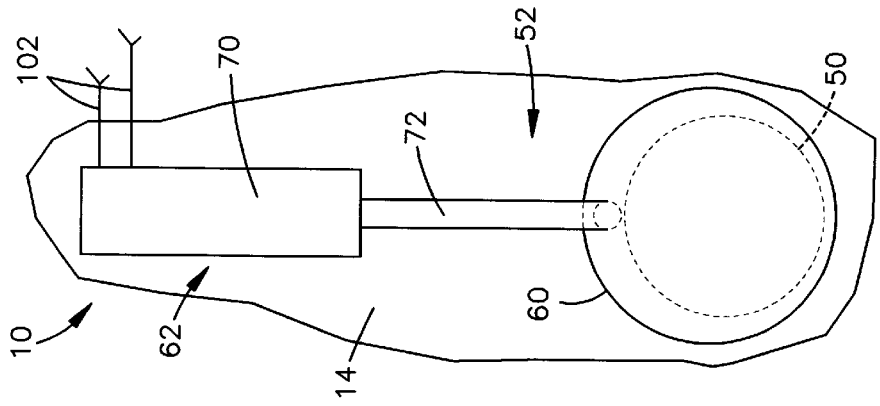
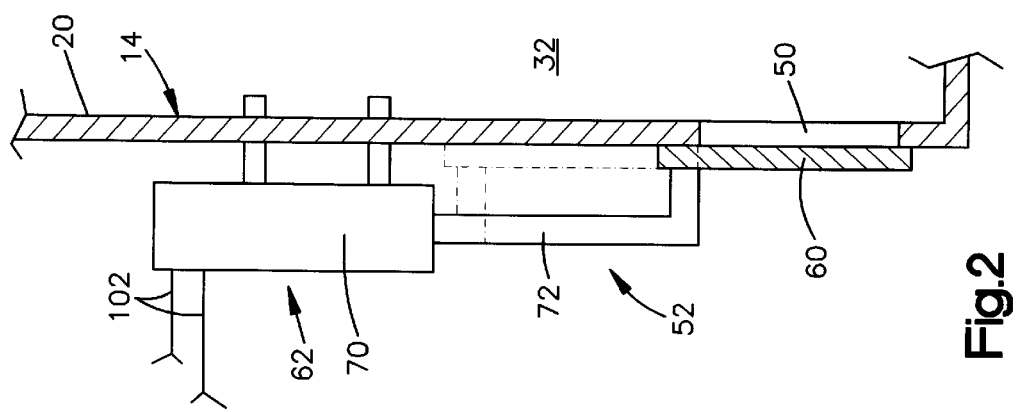

AIR BAG MODULE WITH ELECTRONICALLY MODULATED VENT

BACKGROUND OF THE INVENTION

1. Technical Field

The present invention relates to a vehicle occupant protection apparatus including an inflatable vehicle occupant protection device, such as an air bag. In particular, the present invention relates to an air bag module in which inflation fluid is selectively vented from the module in order to control the speed and force of deployment of the air bag.

2. Description of the Prior Art

It is known to inflate an air bag to help protect a vehicle occupant in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if the vehicle occupant is smaller than a predetermined size or is closer to the vehicle instrument panel than a predetermined distance, then it may be desirable to reduce the speed and force with which the air bag inflates. It is known to vent inflation fluid from the housing of an air bag module in such circumstances, so that less inflation fluid is directed into the air bag.

SUMMARY OF THE INVENTION

The present invention is a vehicle occupant protection apparatus comprising an inflatable vehicle occupant protection device having a deflated condition and an inflated condition for helping to protect a vehicle occupant. An inflation fluid source is actuatable to provide inflation fluid to inflate the inflatable device. The apparatus includes a structure having a vent opening for enabling flow of inflation fluid away from the inflatable device. The apparatus also includes a member movable between a closed condition closing the vent opening and an open condition enabling flow of inflation fluid through the vent opening. The apparatus includes an electrically energizable mechanism to move the member from the closed condition to the open condition to vent inflation fluid through the vent opening. The mechanism also moves the member from the open condition to the closed condition to inhibit venting of inflation fluid through the vent opening.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 2 is a schematic illustration, partially in section, of a venting assembly portion of the apparatus of FIG. 1;

FIGS. 3A–3C are a series of schematic views of the venting assembly of FIG. 1, shown in different positions.

DESCRIPTION OF EMBODIMENTS OF THE INVENTION

The present invention relates to a vehicle occupant protection apparatus including an inflatable vehicle occupant protection device, such as an air bag. In particular, the present invention relates to an air bag module in which inflation fluid is selectively vented from the module in order to control the speed and force of deployment of the inflating air bag.

Figure 1:
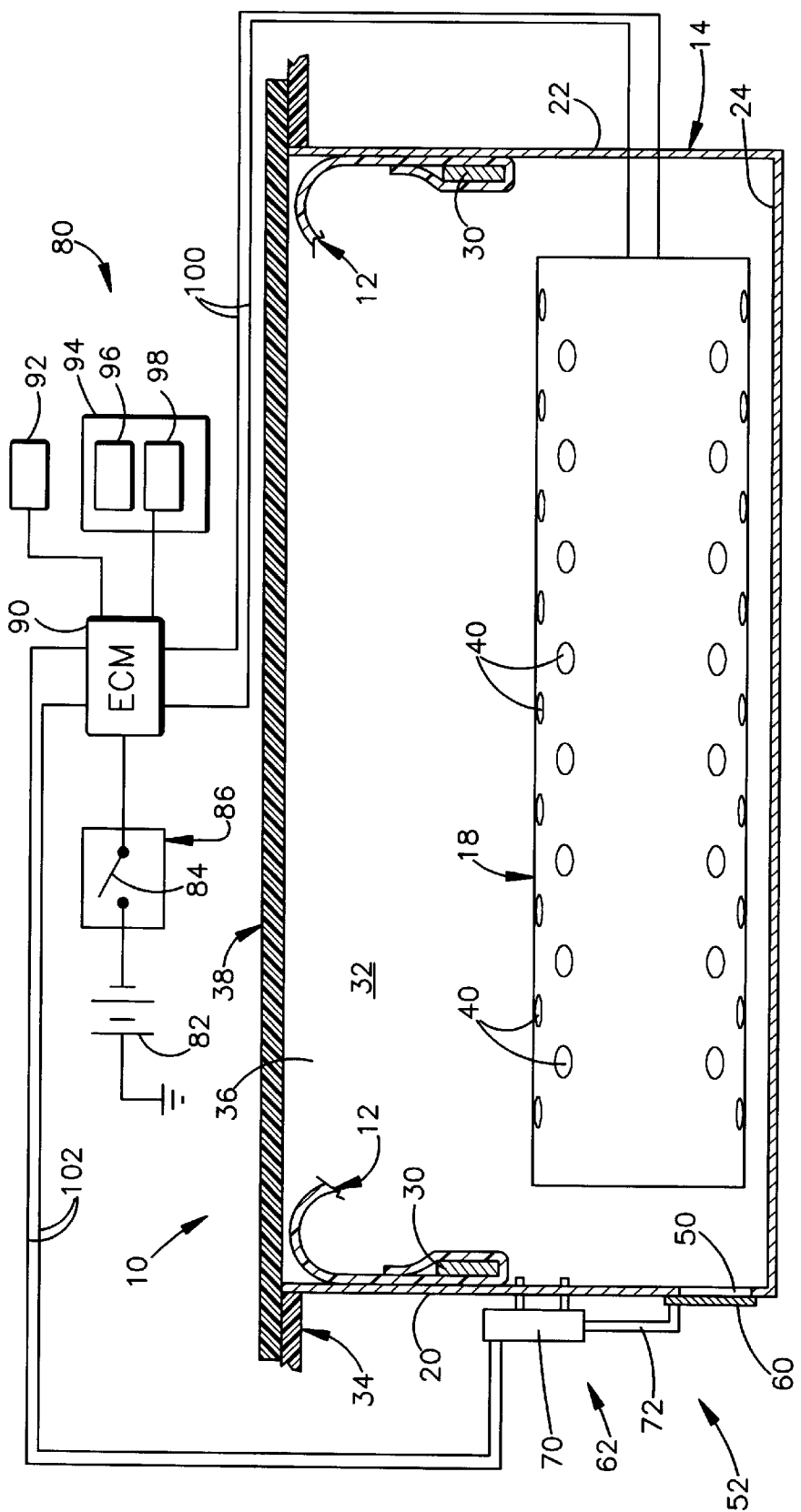
FIG. 1 is a schematic illustration, partially in section, of a vehicle occupant protection apparatus constructed in accordance with the invention.

As representative of the present invention, FIG. 1 illustrates a vehicle occupant protection apparatus 10 that is constructed in accordance with the invention. The apparatus 10 includes an actuatable vehicle occupant protection device 12 of the type commonly known as an air bag. Other actuatable vehicle occupant protection devices that can be used in accordance with the invention include, for example, inflatable knee bolsters, inflatable head liners, inflatable side curtains, knee bolsters actuated by air bags, and seat belt pretensioners. The apparatus 10 also includes a housing 14 and an inflator 18.

The housing 14 is a box-like metal structure having a plurality of walls including first and second opposite side walls 20 and 22 and a back wall 24. The air bag 12 is secured to the side walls 20 and 22 of the housing 14 by a retainer or retaining ring 30. The walls of the housing 14, including the side walls 20 and 22 and the back wall 24, define a chamber 32 in the housing.

The housing 14 is mounted in a vehicle instrument panel 34 in a known manner (not shown). The back wall 24 of the housing 14 is oriented toward the front of the vehicle in which the apparatus 10 is mounted. A deployment opening 36 is defined between the side walls 20 and 22 of the housing 14. The deployment opening 36 is oriented generally toward the rear of the vehicle in which the apparatus 10 is mounted, that is, toward an occupant of the vehicle. A deployment door or cover 38, which may form a portion of the vehicle instrument panel 34, closes the deployment opening 36 when the air bag 12 is in the deflated condition. Although the housing 14 is shown as a separate structure mounted in the instrument panel 34, such a housing could alternatively be defined by the structure of the instrument panel, or by another part of the vehicle from which the air bag 12 is to be inflated to help protect the vehicle occupant.

The inflator 18 is mounted in the chamber 32 of the housing 14 in a known manner (not shown). The inflator 18 comprises a source of inflation fluid for inflating the air bag 12. As known in the art, the inflator 18 may contain an ignitable gas-generating material, which, when ignited, rapidly generates a large volume of gas. The inflator 18 may alternatively contain a stored quantity of pressurized inflation fluid, or a combination of pressurized inflation fluid and ignitable material for heating the inflation fluid. The inflator 18 has a plurality of fluid outlet openings 40 through which inflation fluid is directed into the chamber 32 in the housing 14 upon actuation of the inflator. The housing 14 directs inflation fluid under pressure, from the chamber 32, toward and into the air bag 12, upon actuation of the inflator 18.

The housing 14 has a vent opening 50 for enabling flow of inflation fluid out of the housing and away from the air bag 12. The vent opening 50 is located in the side wall 20 of the housing 14.

A vent assembly 52 is operable to cover and uncover the vent opening 50 to control the flow of inflation fluid through the vent opening and out of the housing 14. The vent assembly 52 (FIG. 2) includes a movable member in the form of a door 60. The door 60 is supported on the housing 14 for sliding movement between a closed condition closing the vent opening 50 (FIG. 3A) and an open condition enabling flow of inflation fluid out of the housing 14 through the vent opening (FIG. 3C). The door 60 also is movable to any one of a plurality of intermediate (partially open or partially closed) positions, as exemplified by the one intermediate position illustrated in FIG. 3B.

The vent assembly 52 further includes an electrically energizable mechanism 62 for moving the door 60. The electrically energizable mechanism 62 includes a solenoid indicated schematically at 70. The solenoid 70 is, preferably, a fast-acting, bi-directional solenoid. An actuator rod 72, or similar structure, is connected between the solenoid 70 and the door 60, for transmitting motive force from the solenoid to the door.

The solenoid 70, when electrically energized in a first manner, is operable to move (push) the door 60 in a first direction from the closed condition (or from a partially closed condition) toward the open condition. The solenoid 70, when electrically energized in a second manner, is operable to move (pull) the door 60 in a second direction, opposite the first direction, from the open condition (or from a partially open condition) toward the closed condition. The door 60 is normally in a closed position covering the vent opening 50.

The apparatus 10 includes vehicle electric circuitry indicated schematically at 80 (FIG. 1). The vehicle electric circuitry 80 controls the operation of the inflator 18 and the vent assembly 52. The vehicle electric circuitry 80 includes a power source 82, which is preferably the vehicle battery and/or a capacitor, and a normally open switch 84. The switch 84 is part of a collision sensor 86, which senses a condition indicating the occurrence of a vehicle collision. The collision-indicating condition may comprise, for example, sudden vehicle deceleration caused by a collision.

The vehicle electric circuitry 80 further includes a controller, or control module, 90 for controlling the operation of the vehicle electric circuitry 80, an occupant position sensor 92, and circuitry associated with a seat belt system 94. The position sensor 92 generates a control signal indicative of the position of a vehicle occupant in the interior of a vehicle. The seat belt system 94 helps protect the vehicle occupant by controlling the position of the vehicle occupant. The seat belt system 94 includes a buckle assembly 96 and a means, such as a buckle switch 98, for generating a control signal indicative of a buckled or unbuckled condition of the buckle assembly.

If a collision-indicating condition sensed by the collision sensor 86 is above a predetermined threshold, it indicates the occurrence of a collision for which inflation of the air bag 12 is desired to help protect the occupant of the vehicle. The switch 84 in the collision sensor 86 closes and the control module 90 transmits an actuation signal to the inflator 18 over lead wires 100. When the inflator 18 is actuated, it emits a large volume of inflation fluid into the chamber 32 in the housing 14. The housing 14 directs the inflation fluid from the inflator 18 into the air bag 12 to inflate the air bag.

As the inflation fluid begins to inflate the air bag 12, the air bag moves rapidly and forcefully outward against the deployment door 38. The inflating air bag 12 moves the deployment door 38 outward, and the air bag inflates through the deployment opening 36 into a position to help protect the vehicle occupant.

Upon such an occurrence of a condition requiring actuation of the inflator 18, the control module 90 receives the control signals from the position sensor 92 and from the buckle switch 98. The control module 90 determines, on the basis of those signals, whether it is desirable to actuate the vent assembly 52. This determination, as well as the actuating of the vent assembly 52 itself, can be made prior to actuation of the inflator 18, or at the same time as actuation of the inflator, or after actuation of the inflator.

The control signal from the position sensor 92 may indicate a condition in which the vehicle occupant is positioned at least a predetermined distance from the apparatus 10. The control signal from the buckle switch 98 may indicate a buckled condition of the buckle assembly 96. If the control module 90 receives both off these control signals, the control module determines that the door 60 of the vent assembly 52 should remain in the closed condition. The solenoid 70 is not energized by the control module 90. The door 60 remains in the closed condition, covering the vent opening 50. As a result, the air bag 12 inflates with maximum speed and force.

On the other hand, the control signal from the position sensor 92 may indicate a condition in which the vehicle occupant is closer than a predetermined distance to the apparatus 10. Also, the control signal from the buckle switch 98 may indicate an unbuckled condition of the buckle assembly 96. If the control module 90 receives signals indicating one or both of these conditions, the control module determines that the door 60 of the vent assembly 52 should be moved to a position at least partially open to vent inflation fluid from the housing 14. The control module 90 determines to what extent the vent opening 50 should be uncovered, to control the amount of fluid vented.

In the event that the control module 90 determines that the door 60 should be opened at least partially, a control signal is transmitted from the control module, through lead wires 102, to the solenoid 70 of the vent assembly 52. The solenoid 70 is electrically energized in the first manner and causes the rod 72 to transmit motive force to the door 60. The door 60 is moved or pushed from the closed position shown in FIG. 3A to a partially open position as shown in FIG. 3B or to a fully open position as shown in FIG. 3C.

When the door 60 moves from the closed position toward the open position, the vent opening 50 in the side wall 20 of the housing 14 is at least partially uncovered. The uncovering of the vent opening 50 enables inflation fluid from the inflator 18 to flow out of the chamber 32 through the vent opening. The inflation fluid that flows out of the chamber 32 through the vent opening 50 does not flow into the air bag 12 to inflate the air bag. As a result, the amount of inflation fluid flowing into the air bag 12, or the pressure of the inflation fluid, is reduced as compared to the amount or pressure of inflation fluid flowing into the air bag when the vent opening 50 remains covered by the door 60 in the closed condition. This change in the flow of inflation fluid can help to reduce or control the speed and force of deployment of the air bag 12.

At any time after the door 60 is at least partially opened, if the position sensor 92 and the buckle switch 98 indicate that the vehicle occupant is in a proper position and that the buckle assembly 96 is buckled, the control module 90 may energize the solenoid 70 to move the rod 72 in the second direction, opposite the first direction. Energizing the solenoid 70 in this second manner causes the rod 72 to pull or move the door from the open condition, or from a partially open condition, toward the closed condition. This movement reduces the flow area of the vent opening 50 and thus inhibits venting of inflation fluid from the chamber 32.

It should be understood that the position sensor 92 and the buckle switch 98, which determine actuation of the vent assembly 52, may be augmented by other sensors. For example, a vehicle condition sensor might sense the presence of a rearward-facing child seat, and the control module 90 could then determine that all, or substantially all, of the inflation fluid from the inflator 18 should be vented from the housing 14 rather than directed into the air bag 12. Other sensors that could be used include a weight sensor, a belt tension sensor, an occupant size sensor, a module temperature sensor, and a crash severity sensor.

Furthermore, it should be understood that the control module 90 can determine not only whether, but also when, inflation fluid from the inflator 18 should be vented from the housing 14. The solenoid 70 has an action time of about one to two milliseconds. Therefore, the position of the door 60 relative to the vent opening 50 can be changed more than once, and at least several times, during the flow of inflation fluid from the inflator 18 into the air bag 12. Thus, the controller 90 can electronically regulate the rate of bag fill in accordance with the inputs from the sensors 92 and 98. The vent opening 50 can be fully or partially opened or closed at almost any selected time during the crash event. Thus, the output curve of the inflator 18, which represents the volume and flow rate of the inflation fluid into the air bag 12, can be shaped over a period of time during the filling of the air bag.

Figure 4:
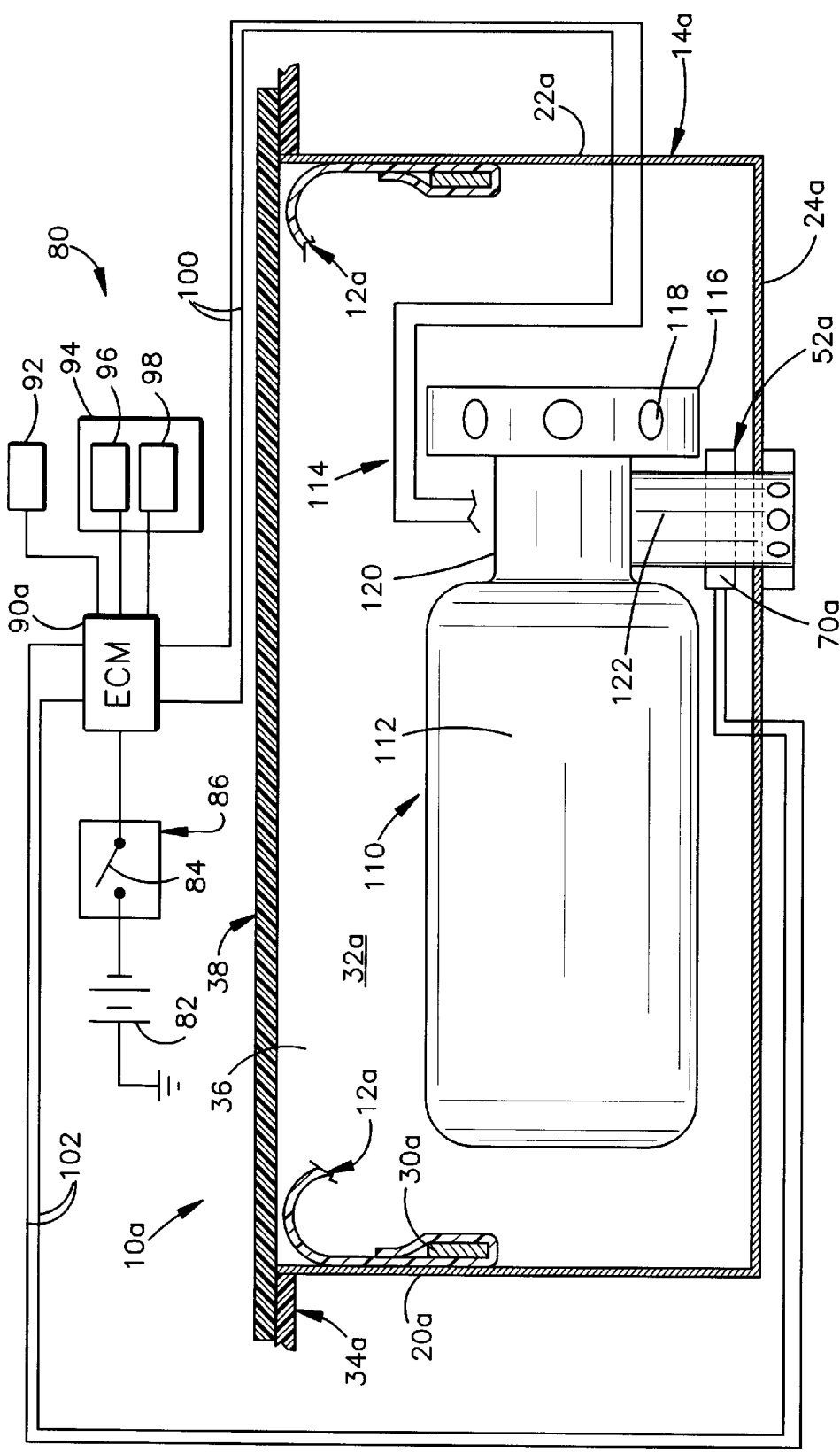
FIG. 4 is a view similar to FIG. 1 of a vehicle occupant protection apparatus constructed in accordance with a second embodiment of the invention.

FIG. 4 illustrates a vehicle occupant protection apparatus 10*a* constructed in accordance with a second embodiment of the invention. The apparatus 10*a* is similar in construction to the apparatus 10 (FIGS. 1–3C), and parts of the apparatus 10*a* that are the same as, or similar to, parts of the apparatus 10 are given the same reference numerals with the suffix "a" attached.

The apparatus 10*a* includes an inflator 110 that has a main body portion 112 and an outlet assembly 114 at one end of the main body portion. The outlet assembly 114 includes a manifold 116 having a plurality of inflation fluid outlets 118. A neck portion 120 of the outlet assembly 114 is disposed between the main body portion 112 and the manifold.

A vent tube 122 protrudes from the neck portion 120 of the inflator 110. The vent tube 122 is connected with and extends through the housing wall 24*a*. The vent tube 122 supports the neck portion 120 of the inflator 110, and the inflator as a whole, on the housing wall 24*a*.

A solenoid-operated vent assembly indicated schematically at 52*a* is located in the vent tube 122. The vent assembly 52*a* preferably includes a fast-acting, bi-directional solenoid 70*a* like the solenoid 70 (FIG. 1). The vent assembly 52*a* is operable to open fully or partially, or to close, the vent tube 122. Operation of the vent assembly 52*a* may be controlled by the same vehicle electric circuitry as in the first embodiment of the invention.

Inflation fluid from the main body portion 112 of the inflator 110 flows through the neck portion 120 before reaching the manifold 116. When the vent tube 122 is open, some inflation fluid is vented from the housing 14*a* rather than being directed into the air bag 12*a*. Thus, the vent assembly 52*a* is operable to control the output curve of the inflator 110, that represents the volume and flow rate of the inflation fluid into the air bag 12*a*, during the filling of the air bag.

From the above description of the invention, those skilled in the art will perceive improvements, changes and modifications in the invention. For example, both the vent opening and the door have a circular configuration as illustrated in the first embodiment. They could, alternatively, have a different configuration. Such improvements, changes and modifications within the skill of the art are intended to be covered by the appended claims.

Having described the invention, we claim:

1. A vehicle occupant protection apparatus comprising:

a housing having a plurality of walls defining a chamber;

an inflatable vehicle occupant protection device located in said chamber and having a deflated condition and an inflated condition for helping to protect a vehicle occupant;

an inflation fluid source located in said chamber and actuatable to provide inflation fluid to inflate said inflatable device;

said inflation fluid source including a main body portion and a fluid outlet assembly, said fluid outlet assembly comprising:

an inflation fluid outlet and a neck portion located between said main body portion and said inflation fluid outlet;

a vent tube extending transversely from said neck portion, said vent tube being connected with and extending through said housing wall, said vent tube having a vent opening for directing inflation fluid away from said inflatable device;

a member located in said vent tube and movable between a closed condition closing said vent opening and an open condition enabling flow of inflation fluid through said vent opening; and an electrically energizable mechanism to move said member from the closed condition to the open condition to vent inflation fluid through said vent opening and to move said member from the open condition to the closed condition to inhibit venting of inflation fluid through said vent opening.

2. An apparatus as set forth in claim 1 wherein said vent tube supports said inflation fluid source in said housing.

* * * * *